United States Patent
Manzouri

Patent Number: 6,078,396
Date of Patent: Jun. 20, 2000

[54] NON-CONTACT DEFORMATION MEASUREMENT

[75] Inventor: Shahamat Manzouri, East Yorkshire, United Kingdom

[73] Assignee: British Aerospace Public Limited Company, Hants, United Kingdom

[21] Appl. No.: 09/095,012

[22] Filed: Jun. 10, 1998

[30] Foreign Application Priority Data

Jun. 10, 1997 [GB] United Kingdom .................... 9711858

[51] Int. Cl.⁷ ....................................... G01B 9/02
[52] U.S. Cl. ........................................... 356/354; 356/374
[58] Field of Search ..................................... 356/374, 354, 356/32, 33, 34, 35, 35.5

[56] References Cited

U.S. PATENT DOCUMENTS 4,125,025  11/1978  Suzuki et al. ............................. 73/655

OTHER PUBLICATIONS

Idesawa et al., "Scanning Moire Method and Automatic Measurement of 3–D Shapes," Applied Optics, vol. 16, No. 8, Aug. 1977, pp. 2152–2162.

Idesawa, Masanori et al., "Scanning Moiré Method and Automatic Measurement of 3–D Shapes", Applied Optics, vol. 16, No. 8, Aug. 1977, pp. 2152–2162.

Primary Examiner—Robert H. Kim
Assistant Examiner—Andrew H. Lee
Attorney, Agent, or Firm—Nixon & Vanderhye P.C.

[57] ABSTRACT

A method of analysing out of plane deflections in materials under load utilising the projection of a reference grating on to such a material whilst recording information relating to the individual color channels of a color video recording camera thereby providing an imaginery reference grating allowing a conventional Moire fringe analysis of the material.

6 Claims, 1 Drawing Sheet

NON-CONTACT DEFORMATION MEASUREMENT

BACKGROUND OF THE INVENTION

1. Field of the Invention

This invention relates to non contact testing methods and apparatus for measuring structural displacements and deformation, and more particularly to such methods and apparatus for use in the field of structural test engineering.

2. Discussion of Prior Art

Known methods of measuring structural displacements without the need for physical contact between the measuring apparatus and the structure under test, include holographic and holographic related methods such as Electronic Speckle Pattern Interferometry and Shearography. These methods are sensitive to small ground vibrations and accordingly require expensive and complex mounting arrangements to produce accurate results. Known optical methods of measuring deformation of a specimen induced by static or dynamic loading use the phenomena known as Moiré fringes.

Moiré fringes are produced when two identical optical transmission gratings, each of which consists of alternate rulings of opaque and transparent elements of equal width, are placed face to face with their rulings inclined at a small angle and viewed against a bright background. In this situation, no light will be transmitted where the opaque elements of one grating fall on the transparent elements of the other. The appearance is of a set of dark fringes crossing the gratings, these being known as Moiré fringes. A simple example of the fringe patterns produced by this phenomena can be observed by viewing light through two overlaid layers of fine net material.

If one of the gratings is kept stationary and the other is moved in a direction perpendicular to its rulings the Moiré fringes move in a direction parallel to the rulings by a distance which is a magnification of the distance travelled by the moving grating. Additionally if the rulings of the transmission gratings are held parallel to each other and one grating is displaced along a line normal to the rulings, shades of grey are observed which vary cyclically as displacement increases.

If the lines of one transmission grating are projected on to a surface, and viewed through the other reference grating, the observed fringes can also be used to determine displacement of the surface normal to itself. As the surface is moved away from the light source the projected lines on the surface move in one direction in the plane of the surface and as the surface moves towards the light they are moved in the opposite direction. If the projected grating lines are then viewed through the reference grating, with their rulings parallel, the whole exposed surface area is observed as one shade of grey. As the surface moves towards or away from the light source cyclically varying shades of grey are observed. The intensity of the grey shade is a function of the magnitude of the displacement normal to the surface on to which the first grating lines are projected.

The method of producing Moiré fringes in which lines of one grating are projected onto a surface which is then viewed through a reference grating is known in the art as Projection Moiré Interferometry (PMI). The method has been used in numerous applications including the measurement of the amplitude of vibration of an object or panel under vibration loading. For example, in U.S. Pat. No. 4,125,025 a first optical system periodically projects the image of a grating onto the vibrating object and a second optical system having an optical axis intersecting that of the first optical system shares the image projected on, and reflected from, the object and records the shared image on photographic film. Measurement of the amplitude of vibration is obtained from analysis of the form of the Moiré fringe pattern produced.

The above method relies on the projection of a series of parallel lines onto the surface of the material under test and the viewing of that surface through a suitable physical reference grating. A phase map of the surface can only be obtained by moving one of the gratings through one full pitch or 360 degrees phase shift in a number of equal steps. At each of these steps the image is captured and the fractional fringe order is obtained by looking at the intensity variations of each point throughout the 360 degree phase shift.

In dynamic tests this method cannot produce satisfactory results due to the fact that each image frame requires that the specimen remains stationary for the length of time that the diffraction grating is moved through the required steps. It can therefore be seen that the Projection Moiré Fringe method of displacement measurement for out of plane deflections cannot be applied to materials under dynamic test using conventional state of the art methods and equipment.

SUMMARY OF THE INVENTION

Our invention offers a method of utilising Moiré Fringe Interferometry in the analysis and measurement of deflections in materials undergoing dynamic, loading without the need to stop the loading of the material to reorientate the reference grating.

According to the present invention a method of analysing Out of plane deflections in materials under load is characterised in that it comprises the steps of;

i) projecting onto a material specimen under analysis a reference grating having a pitch equal to one third the width of a pixel on a CCD colour video camera;

ii) using the colour video camera to capture frame by frame images of the material specimen and associated projected reference grating lines thereon, whilst the material specimen is undergoing deflections due to loading by sequentially recording and storing information relating to each colour channel of the colour video camera in a frame store;

iii) analysing the recorded images of the material and associated projected reference grating lines thereon by selecting recorded information from pairs of colour channels in turn, so as to create the effect of an imaginary interferingly superimprosed on the projected reference grating; and iv)

The invention utilises the repeated linear pattern of red, green and blue pixels found in a colour CCD recording camera as a component of a reference grating for use in Moiré fringe analysis.

BRIEF DESCRIPTION OF THE DRAWINGS

The invention will now be described by way of a non-limiting example, by reference to the following drawings, of which.

BRIEF DESCRIPTION OF PREFERRED EMBODIMENTS

Figure 1:
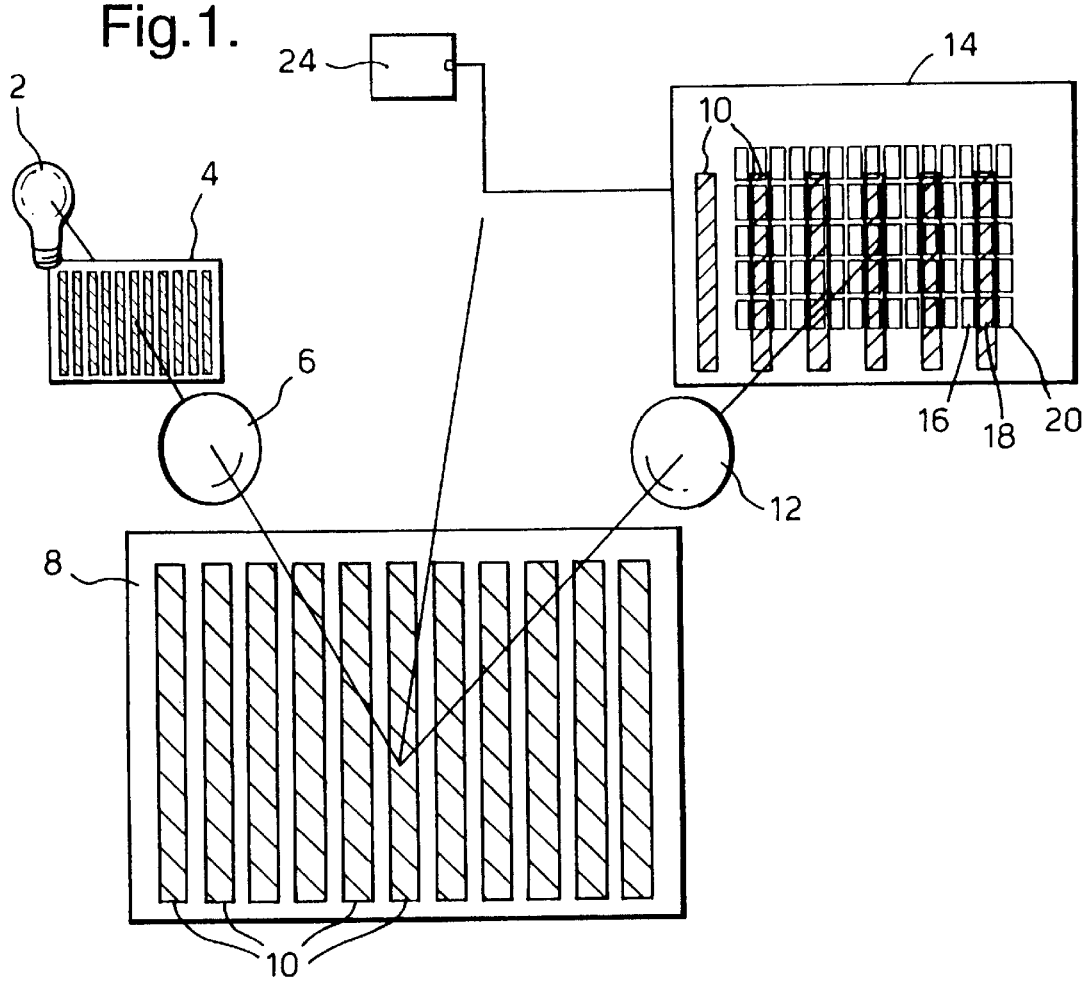
FIG. 1 shows a schematic layout of Moiré fringe analysis apparatus in accordance with the invention, and, FIG. 2 is a diagrammatic representation of the light receiving pixels on a CCD camera used in accordance with the invention.

In FIG. 1, an electromagnetic source 2, (in this particular example an illuminated light bulb), is positioned behind a grating 4 and a suitable optical lens 6 so as to project grating lines 10 onto the surface of a specimen 8 undergoing analysis. The sensor element 14 of a colour Charged Coupled Device (CCD) camera comprising columns of red, green and blue light sensitive pixels 16, 18 and 20 respectively is directed to receive light from the specimen 8 through a lens 12. Data representing the intensity of light of the appropriate colour falling on the pixels in each column of pixels in a frame period is stored in a frame store 24. Grating lines 10 as viewed by the camera are designed to be one third the width of a complete pixel including all three colors i.e. the width of any one of the columns of pixels 16, 18 or 20. The lines have a pitch substantially equal to the distance between centers of adjacent pixels of the same color.

Figure 2:
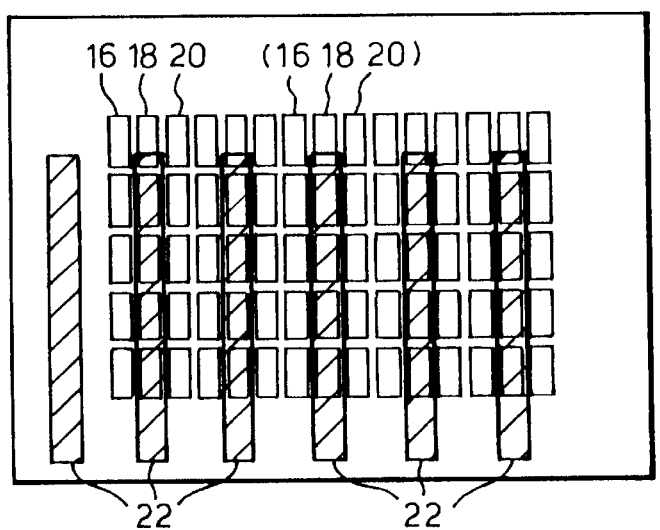

FIG. 2 shows the CCD camera's columns of light receiving pixels, 16,18 and 20 and the 'imaginary' grating 22 produced by the selection of only the red 16 and blue 20 receiving pixels when viewing the image of the specimen 8.

In operation the light source 2 projects the image of grating 4 through lens 6 onto the surface of the specimen 8 under test to produce a grating image 10. The specimen 8 and it's associated grating image 10 is then viewed by the CCD camera 14 which records red, blue and green images of the specimen 8 under all test deformation conditions and loads them into the frame store 24 for subsequent analysis. The recorded images are then analysed frame by frame using Moiré fringe interferrometry utilising date representing selected pixel signals from pairs of pixel columns of the CCD sensor element 14. This information is derived from the red, green and blue 16,18,20 CCD outputs recorded by the camera and stored in the frame store.

Making the appropriate selection and use of recorded pixel information relating to CCD elements in columns 16,18,20 creates the effect of a virtual or imaginary grating 22 as is shown in FIG. 2. Averaging data from the red sensitive pixel columns 16 and the blue sensitive columns 20 has the effect of creating an imaginary grating with it's vertical lines positioned at the location of each of the columns of green CCD elements 18 which may be viewed on a monitor screen. Similarly selecting to view the average of the other two possible combinations of pairs of columns, i.e. green 19 with blue 20, and red 16 with green 13 enables the monitor to display any of three imaginary gratings between them covering 360 degrees of phase shift, in three order steps of 120 degrees, without the requirement of physically having to move a reference grating through incremental phase steps in front of the CCD camera 14. This allows the monitoring and analysis of real time deflections in specimens 8 subjected to dynamic loading without the onerous requirements of having to stop the test to incrementally move the reference grating to achieve the required phase shifts.

Additionally, the information recorded in the frame store relating to each individual CCD element of columns 16,18, and 20 will enable the intensity of light falling on each CCD element of columns 16,18, and 20 to be evaluated and thus the out of plane height displacement of the surface deformation to be deduced.

What is claimed is:

1. A method of analysing out of plane deflections in materials under load, comprising the steps of:

i) projecting onto a material specimen under analysis a grating;

ii) using a CCD colour video camera to capture frame by frame images of the material specimen and associated grating lines projected thereon, where said image of said projected grating lines has a pitch substantially equal to the distance between adjacent pixels of the same color on said CCD color video camera in a direction perpendicular to the grating lines, whilst the material specimen is undergoing deflections due to loading by sequentially recording and storing the information relating to each colour channel of the colour video camera in a frame store;

iii) analysing the recorded images of the material and associated projected grating lines thereon by selecting recorded information from pairs of colour channels in turn, so as to create the effect of an imaginary grating interferingly superimposed on the projected grating; and, iv) deriving from said analysis intensity and phase data corresponding to the out of plane deflections of the material at sequential times.

2. A method of analysis as described in claim 1 wherein the recorded images are captured on a video recorder.

3. A method of analysis as claimed in claim 1 wherein the recorded images are utilised to map the phases on the material under analysis by using different colours to represent the recorded phase changes.

4. A method of analyzing of out of plane deflections in materials under load, comprising the steps of:

i) projecting a grating onto a material specimen under analysis;

ii) using a color video recording camera to record the images of the material specimen and associated projecting grating lines, while the material specimen is undergoing deflections due to loading, the pitch of the grating image viewed by the color video camera being substantially equal to the distance between the centers of two closest pixels of the same color on the color video camera in a direction perpendicular to that of lines of the projected grating;

iii) recording and storing the information relating to each color channel of the color video recording camera in a storage means; and iv) analyzing the recorded images of the material by removing the information from each of the individual color channels of the CCD recording camera in turn, so as to create an "imaginary" reference grating thereby allowing a conventional projection Moire fringe interferometric analysis of the material specimen to be conducted.

5. A method of analysis as described in claim 4 wherein the recorded images are captured on a video recorder.

6. A method of analysis as claimed in claim 4 wherein the recorded images are utilized to map the phases on the material under analysis by using different colors to represent the recorded phase changes.

* * * * *